3,396,998
FISHHOOK HOLDER
Wright A. Scoville, 20 S. Barneburg Road,
Medford, Oreg. 97501
Filed Mar. 29, 1967, Ser. No. 626,846
5 Claims. (Cl. 289—17)

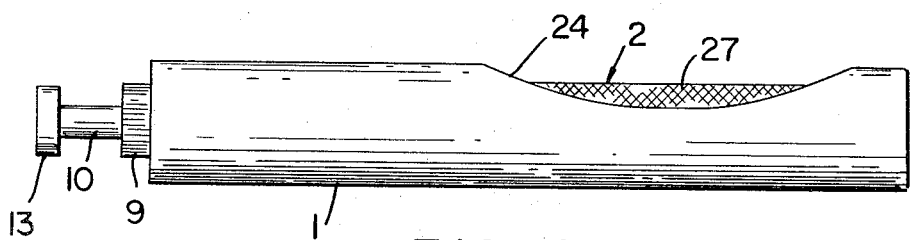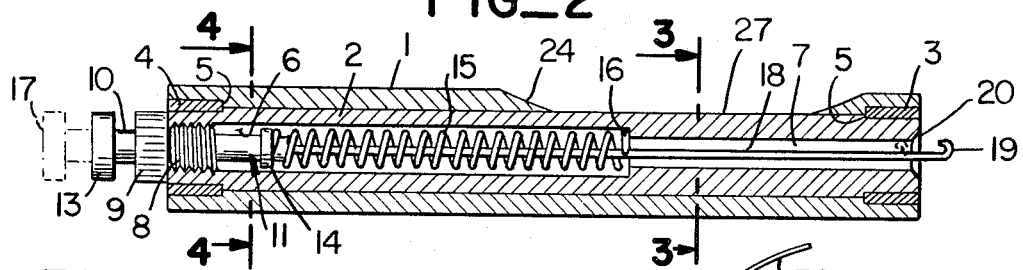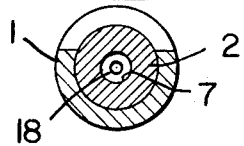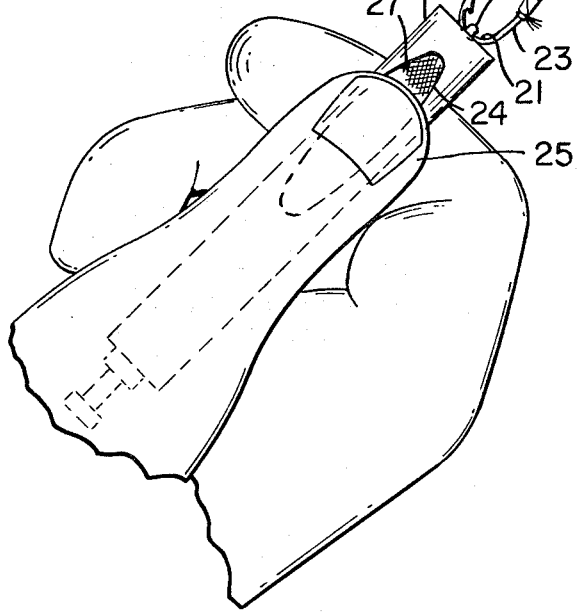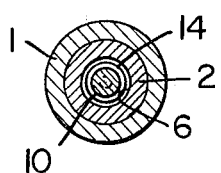
INVENTOR
WRIGHT A. SCOVILLE
BY
*Boyken, Mohler, Foster & Schlueter*
ATTORNEYS United States Patent Office 3,396,998
Patented Aug. 13, 1968

ABSTRACT OF THE DISCLOSURE

A holder for holding and rotating a fishhook in the operation of securing a snell leader to the eye of the hook by a twisted or similar knot.

Background of the invention

In tying a snell or leader to an eyed fly or a plain hook by the commonly employed twisted knot requires projecting one end portion of the leader through the eye of the hook and then bending the projecting end portion back to alongside the main leader forming a loop at the bend, and twisting said portion and the main leader together for a plurality of turns after which the remainder of the untwisted end portion is thrust through the loop at the eye. The twisted portion is tightened to provide a neat tight knot of adjoining compact coils of the leader adjacent to the eye of the hook.

Hook holders for engaging and holding the fishhook during the tying operation are old in the art, but in twisting the projecting end of the leader and the main portion of the latter together, the grip on the holder must be manually loosened and regripped for each of the five to seven twists that are made. As a result, the operation is tedious and the holder may be dropped during the process.

Summary of invention

The present invention provides means for the operator to firmly hold the hook and rotate the same to provide five to seven twists of the projected end of the leader by only several simple strokes of the thumb transversely across the holder and in engagement with a rotatably supported part of the device that grips the hook. The eye carrying shank of the hook projects outwardly of the hook holder generally in axial extension of the axis of rotation of the rotatably supported part for rotation of the eye about said axis to thereby effect twisting of the end portion of the leader with the latter when said end portion is projected through said eye and then bent back alongside the leader.

Brief description of the drawings

FIG. 1 is a side elevational view of the fishhook holder in an inoperative position with the fishhook engaging means retracted into the holder.

FIG. 2 is a cross sectional view taken through the holder seen in FIG. 1, longitudinally of the holder with the fishhook engaging portion projected from the outer end of the holder for engaging a fishhook.

FIG. 3 is a cross sectional view taken along line 3—3 of FIG. 2.

FIG. 4 is a cross sectional view taken along line 4—4 of FIG. 2.

FIG. 5 illustrates the holder in the hand of an operator with the thumb in a position for rotating the portion of the holder that grips the fishhook, said fishhook being shown held by the holder and the leader being shown twisted with the end of the latter thrust through the loop of the leader ready for cinching to form the final knot.

FIG. 6 is an enlarged fragmentary view showing the completed knot.

In detail, the holder illustrated comprises an outer elongated tube 1, and an inner tube 2 coaxial and co-extensive with the outer tube (FIG. 2).

The outer tube 1 is correspondingly counterbored at its ends to receive a pair of corresponding plain end thrust bearings 3, 4 that are press-fitted into the counterbores for securement in the ends of the outer tube 1. The inside diameters of the bearings 3, 4 are slightly less in diameter than the outer diameter of the inner tube 2, and the ends of the latter are reduced in diameter to rotatably fit within bearings 3, 4, thus providing oppositely axially outwardly facing end shoulders 5 on said inner tube bearing against the axially inwardly facing sides of the bearings 3, 4.

The tubes 1, 2 are respectively preferably cylindrical on their radially facing adjacent surfaces as that cylinder 2 is rotatable within tube 1.

The inner tube 2 is formed with a through bore having an inner end portion 6 of greater diameter than the outer end portion 7. The term "inner" used with respect to the length of the holder, refers to the end that is adapted to extend into the hand of the user, while the word "outer" refers to the end that projects from the hand, and at which outer end the fishhook is adapted to be held.

The inner end portion 6 of the central bore in the tube 2 may be longer than the outer end portion 7, and the inner end of portion 6 is interiorly threaded to receive an exteriorly threaded member 8, having a head 9 projecting radially outwardly of the threaded part of said member and adapted to abut the inner end of the inner tube 2 when member 8 is threaded into the inner end of the portion 6 of the bore in said inner tube. This head may have a cylindrical, milled outer peripheral surface to facilitate its rotation by the fingers of the operator.

Slidably extending through a central opening in the member 8 is the inner end portion of a rod 10. This rod is coaxial with said tube 2 and projects outwardly of member 8. An enlarged head 13 is rigid with the outwardly projecting end of said rod 10.

At a point spaced within the bore 6 and spaced from but adjacent to member 8, the rod 10 is formed with a radially outwardly projecting flange 14. The flange 14 provides an abutment for the inner end of a horizontally elongated helical compression spring 15, and the opposite end of said spring reacts against the axially facing shoulder 16 at the juncture between the inner and outer portions 6, 7 of the central bore in tube 2. Said flange 14 is normally yieldably held against the end of member 8 that is within bore 6, it being understood that in FIG. 2 the head 13 has been compressed by the finger of an operator from the dot-dash line position 17, against the resistance of spring 15. In FIG. 1 the head 13 is shown in full line in the extended position.

At a point slightly beyond the flange 14, in the direction toward the outer end of tube 2, the outside diameter of rod 10 is substantially reduced to an outside diameter that is substantially less than the inside diameter of the bore 6. The reduced diameter portion of rod 10 is designated 18 and it extends through spring 15 and bore 6 to a point adjacent to the outer end of the latter when the flange 14 abuts member 8, but when the head 13 on rod 10 is pressed toward the adjacent end of tube 2 the outer end of the portion 18 of rod 10 will project outwardly of said outer end as indicated in FIG. 2.

The outer end of portion 18 that is adapted to so project outwardly of tube 2 is formed with a hook 19 that is directed toward tube 2, which hook is adapted to be withdrawn into the bore 6 when the pressure on head 13 is released and nothing is engaged by the hook.

The outer end of bore 7 is formed with a chamfer 20, both to facilitate guiding the hook 19 back into the bore 6, and to form a seat for the bend 21 of a fishhook 23 (FIG. 5) when the fishhook is caught by the hook 19 and is drawn tightly against said chamfer.

The radially outer side of the outer tube 1 is formed with a generally oval shaped opening 24 extending longitudinally of the tube 1 at a point where the inner surface of the thumb 25 (FIG. 5) of the hand of an operator holding the device will normally be positioned when the device is in a position holding the hook 23 preparatory to a tying operation.

Th outer peripheral surface 27 of the inner tube 2 where it is exposed through the opening 24 is knurled or roughened so as to provide an anti-friction surface so that the inner tube 2 will readily be caused to make several complete revolutions upon a single stroking of the thumb in a transverse movement relative to the length of the tube 2 when the device is held in the hand with the outer end of the tube projecting outwardly of the thumb as seen in FIG. 5.

In a tying operation, when the fishhook 23 is gripped by hook 19, the shank 28 projects axially outwardly of the tube 2, and hook 19 may or may not have a fly 29 thereon.

To attach a snell or leader 30, one end of the latter is thrust through the eye 31 and is then brought back to lie alongside the leader, after which the thumb 25 effects rotation of the inner tube 2 and a complete revolution of eye 31 several times for each movement of the thumb, thus winding the projected end 33 of the leader from about five to seven times around the adjacent length of the leader, and then the remaining projected end 34 is thrust through the loop of the leader at the eye 31.

The knot 35 (FIG. 6) is the result of cinching the twisted tie formed in FIG. 5.

This twisting of the projected end of the leader in forming the knot is adapted to be performed expertly and in a fraction of the time required were the entire body of the holder to require manual rotation, and where a fly is on fishhook 23, there is no likelihood of injuring it, due to manipulation of the hook holder, as heretofore has frequently occurred by methods heretofore used.

It is pertinent to note that the device is adapted for use where the fingers are cold and numb, since the rotation of the fishhook is accomplished by mere movements of the thumb while the holder is gripped.

In a broad sense, the present invention may be defined as a fishhook holder that comprises a handle 1 adapted to be stationarily held within the hand of the fisherman in an operating position, and which handle is provided with a projecting portion adapted to project from the hand outwardly of and adjacent to the fingers of the hand. A fishhook gripping means 19 is adapted to engage the bend 21 of a fishhook 23 and supporting means 2 is adapted to support the hook or gripping means 19 for rotation relative to handle 1 about an axis extending generally axially of the shank 28 of the fishhook. The said supporting means includes the roughened surface 27 that is adapted to be frictionally engaged by the thumb 25 when the handle is held stationary in operating position, for rotating the supporting means about said axis upon movement of the thumb laterally of said axis.

A feature of the invention is also its economy of manufacture. The end portion 11 of the rod 10 may be formed separately from the larger diameter portion and thereafter rigidly secured by any suitable means to the latter.

The twisted knot itself is old, hence to one skilled in the art, the operation of the present invention will be clear.

It is to be understood that the invention is to be limited only by the scope of the claims, and not by the detailed description.

I claim:

1. A fishhook holder for holding a fishhook having a shank with an eye at one end and a hook, having a bend, at the other end during tying of a leader or line to the eye with a twisted knot or the like, comprising;
    (a) a straight, tubular handle to be stationarily held in the hand of a person in an operating position in which one end portion projects from the hand between the thumb and forefinger and the remainder extends into the palm of the hand for engagement by other fingers of the holding hand,
    (b) fishhook gripping means at the projecting end of said holder for releasably engaging said bend and for holding said fishhook with the shank extending generally axially outwardly of said handle,
    (c) supporting means supporting said fishhook gripping means within said handle for rotation about the longitudinal axis of the latter while said fishhook gripping means is in gripping relation to said bend,
    (d) said supporting means including a thumb engageable means exposed at a side of said handle for frictional engagement by said thumb and for rotation by the latter relative to said handle upon movement of said thumb relative to said handle while said thumb engageable means is in frictional engagement with said thumb for rotating said shank to wind such leader or line about the shank in forming said twisted knot.

2. In a fishhook holder as defined in claim 1,
    (e) said supporting means comprising a tube rotatable within said handle and coaxial with the latter,
    (f) said fishhook gripping means being rotatable with said tube,
    (g) one side of said handle being formed with an opening exposing said thumb engageable means for said frictional engagement with said thumb.

3. In a fishhook holder as defined in claim 1,
    (e) said handle being formed with an axially extending bore opening outwardly of said one end portion of said handle,
    (f) said fishhook means comprising a rod substantially coaxial with said handle extending from end to end of the latter and movable axially of said handle from a postion with said hook in inoperative position concealed within said bore within said projecting portion to a position projecting outwardly of said projecting portion for engaging over the said bend of a fishhook,
    (g) said supporting means being rotatable within said projecting portion and having a central passageway coaxial with said bore through which said rod is adapted to extend and within which said hook is withdrawn from its outwardly projecting position to said inoperative position,
    (h) means on said supporting means against which said bend is adapted to be held by said hook on said rod when said hook is in engagement with said bend, and
    (i) spring means in engagement with said rod for yieldably urging said hook into hook holding position for yieldably holding said bend against said supporting means when said hook is in engagement with said bend.

4. In a fishhook holder as defined in claim 3,
    (j) a finger engageable projection on said rod projecting from the end of said handle opposite to said projecting portion of the latter movable axially of said handle against the resistance of said spring means for moving said hook on said rod outwardly of said supporting means for releasing the bend of a fishhook and for positioning such bend for engagement by said hook.

5. In a fishhook holder as defined in claim 4, (k) said supporting means comprising a tube within said handle coaxial therewith; and (l) said means on said supporting means against which said bend is adapted to be held being a bevelled end surface on the end of said tube providing a divergently extending surface relative to the axis of said handle for engagement with said bend at opposite sides of said hook when said hook is in engagement with said bend.

References Cited

UNITED STATES PATENTS

| | | | |
|---|---|---|---|
| 2,601,605 | 6/1952 | Fulvio | 289—17 |
| 2,734,299 | 2/1956 | Masson | 289—17 |
| 2,934,369 | 4/1960 | Kennedy | 289—17 |
| 3,101,964 | 8/1963 | Reaser | 289—17 |

LOUIS K. RIMRODT, *Primary Examiner.*